United States Patent [19]
Arroyo

[11] Patent Number: 4,838,568
[45] Date of Patent: Jun. 13, 1989

[54] PROPULSION APPARATUS

[76] Inventor: Joe Arroyo, 1970 S. Crystal, Fresno, Calif. 93706

[21] Appl. No.: 153,041

[22] Filed: Feb. 8, 1988

[51] Int. Cl.⁴ ............................................. B62M 1/12
[52] U.S. Cl. .................................. 280/234; 280/252; 280/288.1
[58] Field of Search ......... 280/234, 233, 240, 281 LP, 280/252

[56] References Cited

U.S. PATENT DOCUMENTS

| | | | |
|---|---|---|---|
| 571,051 | 11/1896 | Pettinati | 280/234 |
| 577,895 | 3/1897 | Wales | 280/234 |
| 598,026 | 1/1898 | Slippern | 280/234 |
| 604,226 | 5/1898 | Cain | 280/234 |
| 619,637 | 2/1899 | Tucker | 280/234 |
| 635,590 | 10/1899 | Quinn | 280/234 |
| 2,884,259 | 4/1959 | Snodgrass | 280/234 |

FOREIGN PATENT DOCUMENTS

930975 6/1955 Fed. Rep. of Germany ...... 280/234
601019 2/1926 France .

Primary Examiner—John A. Pekar
Attorney, Agent, or Firm—Worrel & Worrel

[57] ABSTRACT

A propulsion apparatus for propelling an operator in earth traversing movement. The apparatus includes a frame mounting a pair of wheels which are operable to support an operator in earth traversing movement; a steering assembly borne by the frame and adapted to orient one of the wheels in a selected attitude; a pair of pedals rotatably borne by the frame and adapted to be individually engaged by the legs of the operator; and at least one reciprocally movable member slidably borne on the steering assembly and connected in force transmitting relation to one of the pedals, the member engaged by one of the hands of the operator and operable to impart physical force to the pedal thereby propelling the apparatus in earth traversing movement.

27 Claims, 8 Drawing Sheets

PROPULSION APPARATUS

BACKGROUND OF THE INVENTION

1. Field of the Invention:

The present invention relates to an apparatus for propelling an operator in earth traversing movement and more particularly to such an apparatus which has particular utility when mounted on a bicycle, the apparatus operable to transmit force from the operator's arms to the pedals of the bicycle thereby propelling the bicycle forwardly in a highly efficient fashion.

2. Description of the Prior Art:

The prior art is replete with numerous prior art bicycle, or velocipede related devices which are adapted to be propelled by a man, alone and unaided, and which enable him to travel more quickly and easily over fairly long distances than would ever be possible on foot.

Historical records indicate that as long ago as 1817 there appeared a kind of vehicle known as a "drasine" after the name of its German inventor, Drais. This device consisted of two wooden wheels connected by a wooden frame. The operator of such a device sat upon it, and could propel himself along by thrusting powerfully with his legs. Further Macmillan in Scotland made a bicycle in 1839, the first of which that could be propelled without the rider's feet touching the ground. The Macmillan "hobby horse" had reciprocating cranks mounted to the front of the cycle which were connected by rods to the rear wheels. Moreover, in 1850, a man named Fischer devised a bicycle which mounted cranks and pedals to the front wheels. As a general matter, the bicycle of the modern era, which has evolved from these assorted historical curiosities, typically has a frame manufactured out of strong, lightweight alloy, and a pair of derailer assemblies are mounted on the frame and are operable to move a continuous chain between assorted sized sprockets for purposes of achieving selected gear ratios. More particularly, bicycles can now be purchased which have 3, 5, 10, 15 and even 20 "speeds" or gearing combinations, which are utilized when the bicycle is being propelled over assorted topography.

As of late, sports enthusiasts have been participating in increasing numbers in triathelon competitions. As should be understood, in a triathelon, the competitor competes in three successive events, that is, a long distance swim usually of several miles, followed by a 10 kilometer or longer foot race, and finally a bicycle race of 20 or more miles. The triathelon, of course, tests the strength and endurance of the athlete's entire body, and therefore preparation for same requires a rigorous and often time consuming training program.

Triathletes of all levels of ability have sought after various exercise devices, including bicycles, which would permit them to train effectively for the triathelon event. While the prior art bicycles which have been used to train for the triathelon have operated with varying degrees of success, they have been unsatisfactory in several respects. For example, the bicycles which are currently commercially available only permit the operator to exercise the muscle groups of his lower extremities. This is undesirable inasmuch as it should be readily recognized that the several events which make up the triathelon require the coordinated and simultaneous usage of numerous muscle groups. Further, some training benefits, usually in the form of cardiovascular conditioning, are derived from riding a bicycle over extremely long distances. These long training sessions, however, frequently have a negative impact on the overall conditioning of the athlete inasmuch as the athlete may excessively train his lower extremities.

Still another deficiency common with respect to the prior art bicycles results from characteristics inherent in their design inasmuch as the speed that a bicycle can be propelled over the surface of the earth is generally limited by the physical force which is produced by the operator's lower extremities.

Therefore, it has long been known that it would be desirable to have a propulsion apparatus for propelling an operator in earth traversing movement, the apparatus having particular utility when operatively mounted on a bicycle, the apparatus operable to propel the operator with increased speed and efficiency across the surface of the earth.

SUMMARY OF THE INVENTION

Therefore, it is an object of the present invention to provide an improved propulsion apparatus.

Another object is to provide such an apparatus which has particular utility when mounted on a bicycle, the apparatus including at least one reciprocally movable member which is connected to one of the pedals of the bicycle and which is moved in a reciprocal fashion along a path of travel by one of the operator's hands; the reciprocally movable member transmitting physical force to the pedal through a cable, thereby propelling the bicycle in a highly efficient fashion across the surface of the earth.

Another object is to provide such an apparatus which includes a steering assembly that is adapted to orient one of the wheels of the bicycle in selected operational attitudes, the steering assembly further mounting the reciprocally movable member.

Another object is to provide such an apparatus which includes an adjustable pulley assembly that is operable to receive and maintain the cable under tension or in a taut state as the reciprocally movable member and the pedals are moved in a coordinating fashion.

Another object is to provide such an apparatus wherein the operator can lie in a substantially prone operational position and which permits the operator substantially simultaneously to exercise both his upper and lower extremities.

Another object is to provide such an apparatus which is readily adaptable to most all models and designs of commercially available bicycles.

Another object is to provide such an apparatus which can be readily reconfigured into a number of different forms to suit any operational conditions or operator preferences.

Another object is to provide such an apparatus which is simple to operate, and is easily accessed for purposes of maintenance, modification, or the like.

Another object is to provide such an apparatus which is operable to obtain the individual benefits to be derived from related prior art devices while avoiding the detriments individually associated therewith.

Another object is to provide such an apparatus which is characterized by its ease of utilization, speed of operation, and which can be sold and maintained at a relatively nominal cost.

These and other objects and advantages are achieved in a propulsion apparatus of the subject invention where, in the preferred embodiment, the apparatus includes a frame mounting a pair of earth engaging wheels, the frame and wheels adapted to support the operator in earth traversing movement; a steering assembly is borne by the frame and positions one of the wheels in selected operational attitudes; a pair of pedals are rotatably borne by the frame and disposed in power transmitting relation to one of the wheels; and at least one reciprocally movable member is slidably mounted on the steering assembly and connected in force transmitting relation to one of the pedals by a cable, the member engaged by one of the hands of the operator and operable to impart force to the pedal through the cable thereby propelling the apparatus in earth traversing movement.

DESCRIPTION OF THE PREFERRED EMBODIMENT FIRST FORM

Figures 1, 9:
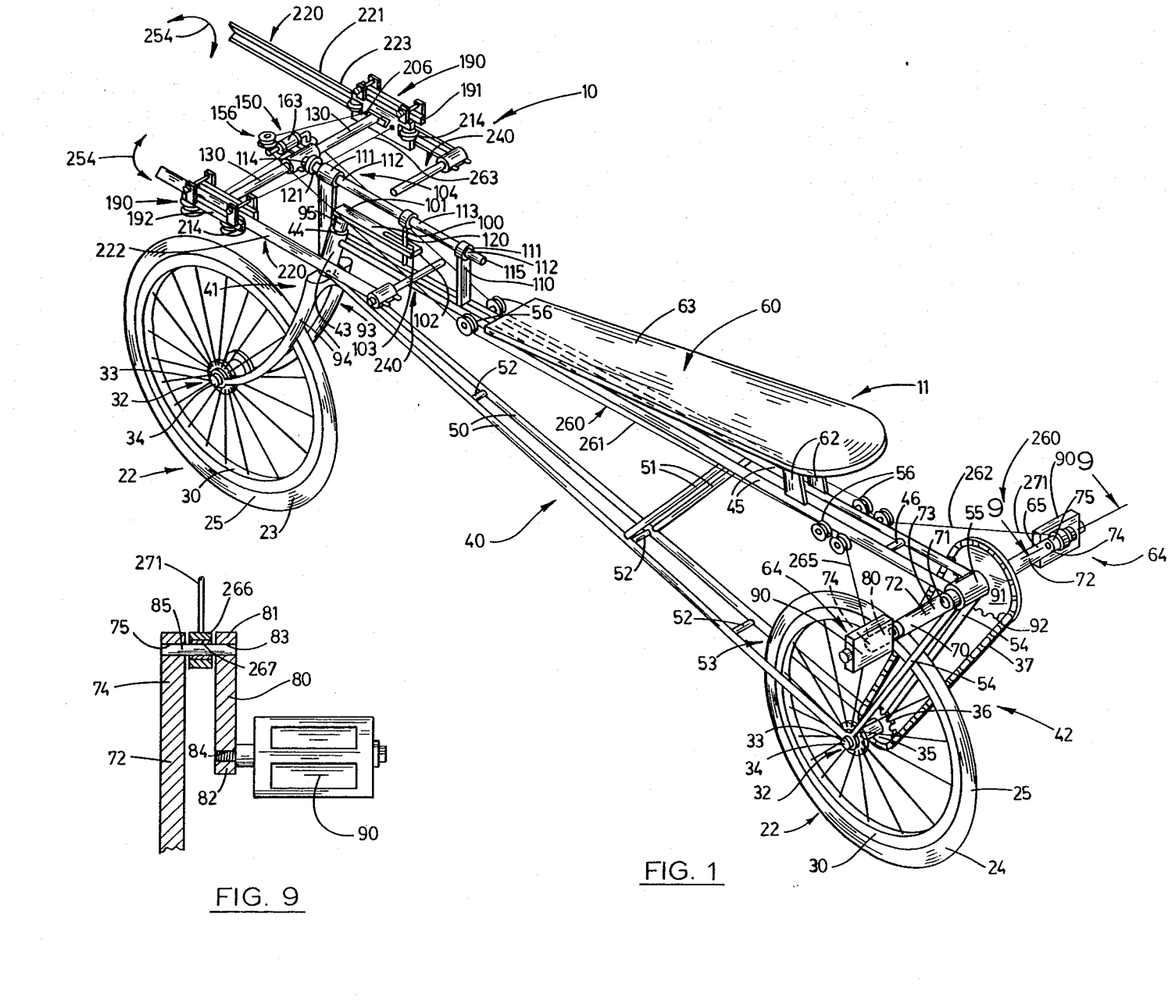
FIG. 1 is a perspective view of the first form of the propulsion apparatus of the subject invention shown in a typical operative configuration with some underlying structures thereof indicated in hidden lines.
FIG. 9 is a fragmentary longitudinal section taken along line 9—9 of FIG. 1.
Figure 10:
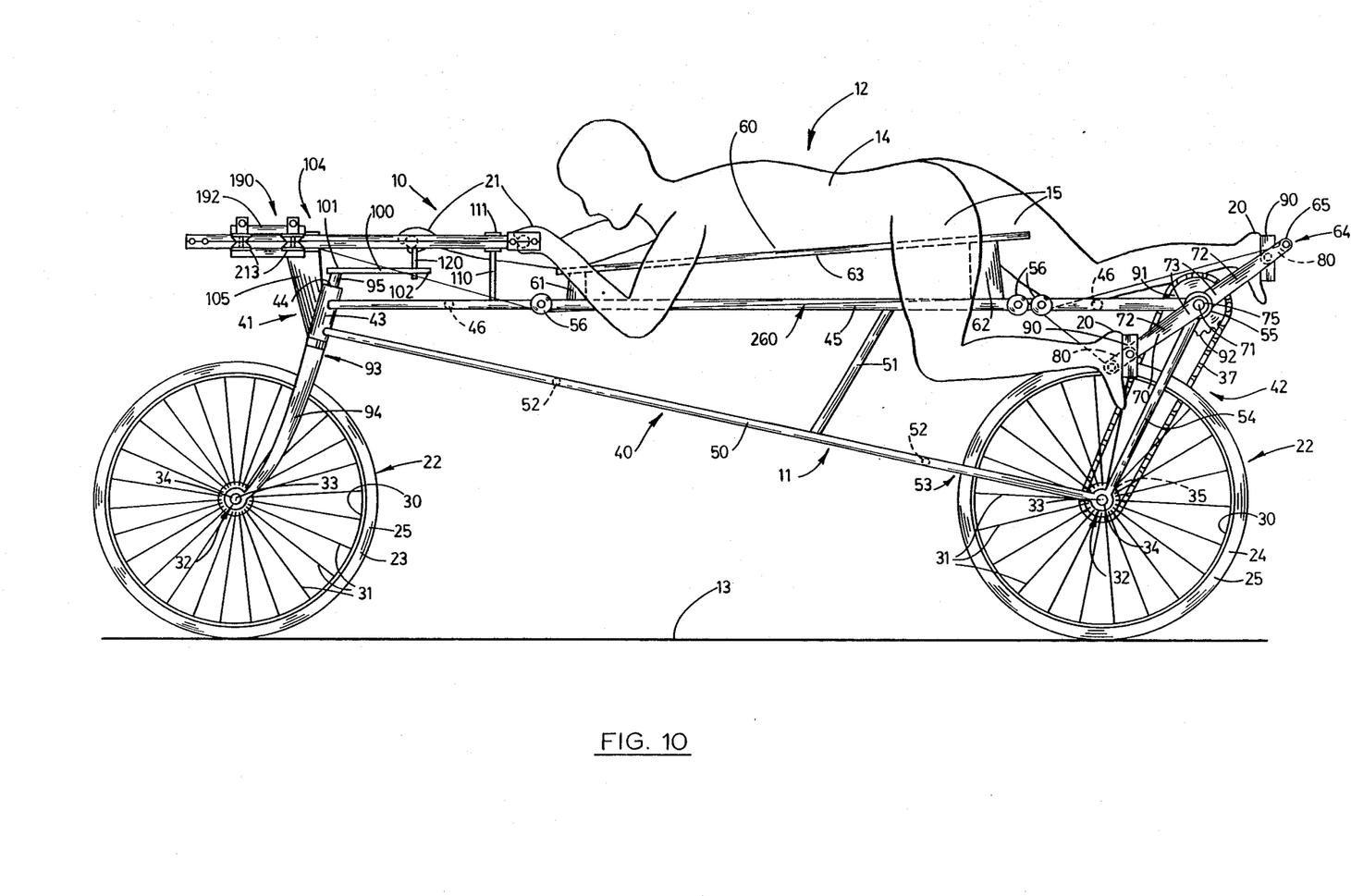
FIG. 10 is a side elevation of the first form of the instant invention and showing an operator lying in a substantially prone position utilizing same.

Referring more particularly to the drawings, the first form of the propulsion apparatus of the subject invention is generally indicated by the numeral 10 in FIG. 1. For illustrative convenience, the apparatus 10 is shown and described herein as it would be installed on or retrofitted to a bicycle 11. However, it should be readily recognized that the subject invention could be employed on any apparatus which mounts a pair of pedals. Further, the apparatus 10 can be modified in such a fashion that it can be mounted easily on a bicycle 11 of conventional design. The pedals of the subject apparatus will hereinafter be discussed in greater detail. As best illustrated by reference to FIG. 10, the apparatus 10 is operable to propel the bicycle 11, with the operator 12 disposed thereon, in a predetermined direction of travel across the surface of the earth 13. The operator's torso 14 is shown in FIG. 10 as being disposed in a substantially prone position and the operator's legs 15 and feet 20 are illustrated in operational positions capable of transmitting physical force to the pedals. The hands 21 of the operator are further shown in FIG. 10 as engaging the handles of the apparatus 10. The pedals and the handles will hereinafter be discussed in greater detail.

The bicycle 11 mounts in rolling receipt on the surface of the earth 13, a pair of earth engaging wheels 22, hereinafter designated as a first wheel 23 and a second wheel 24. Each wheel mounts an inflatable tire 25 which is manufactured out of a suitable synthetic material. The tires 25 are each sealingly mounted on a metal rim 30. Each rim mounts a plurality of spokes 31 which converge substantially centrally of each of the wheels 22 and are releasably affixed to an axle assembly 32. A pair of shafts or spindles 33, having threaded ends (not shown) are individually rotatably mounted to each axle assembly and individual nuts 34 are screwthreadably received on each of the threaded ends of the shafts 33 and are adapted releasably to secure each of the wheels 22 to the bicycle 11. As best seen by reference to FIG. 1, a chain sprocket 35 is mounted to the axle assembly 32 of the second wheel 24. The chain sprocket is of conventional design, that is it has a plurality of substantially equally spaced teeth 36 which are operable to engage a continuous chain 37. The chain sprocket 35 can of course be replaced by a multiple sprocket (not shown) which may have several individual sprockets of assorted sizes serially disposed in predetermined, fixed spaced substantially parallel relation one with the other. In this configuration a derailer assembly (not shown) would be mounted to the bicycle and would be operable selectively to move the continuous chain 37 between the several individual sprockets thereby selectively altering the gear ratio of the bicycle 11.

As best illustrated by reference to FIGS. 1 and 10, the bicycle 11 has a frame that is generally indicated by the numeral 40, and which has a first or forward portion 41 and a second or rearward portion 42. Positioned at the first end 41, of the frame 40, is a tube 43 that defines a cylindrically shaped channel 44. Mounted to the tube 43 by welding or the like and disposed in substantially parallel fixed spaced relation to the surface of the earth 13, is a top or first pair of cross bars or supports 45. The pair of cross bars 45 are mounted to each other and are thereby held in fixed substantially parallel relation one with the other by a pair of bracing members 46. A second or bottom pair of cross bars or supports 50 are mounted to the tube 43 by welding or the like and are disposed in angulated spaced relation to the first pair of cross bars by a pair of bracing members 51. The second pair of cross bars 50 are mounted in angulated spaced relation, one with the other, by a plurality of braces 52, and further defines, in close proximity to the rearward portion 42, of the frame 40, a rear fork 53 which is operable rotatably to mount the second wheel 24. A pair of rearwardly disposed cross bars 54 are affixed to the bottom pair of cross bars and to a second tube 55. The tube 55 further is connected, using welding or the like, to the top pair of cross bars 45. As best seen by reference to FIG. 1, a plurality of pulleys 56 are mounted in predetermined positions along the top pair of cross bars 45 and are operable individually to receive a pair of cables which will hereinafter be discussed in greater detail.

An operator's position, which is generally indicated by the numeral 60, is disposed substantially centrally of the frame 40, and mounted to the top pair of cross bars 45 by forwardly and rearwardly disposed supports 61 and 62, respectively. A seat 63 is mounted to the supports 61 and 62 and is disposed in spaced angulated relation to the top pair of cross bars. The seat is operable to permit the operator 12 to lie in a substantially prone operational position. A pair of pedals 64 are rotatably borne by the frame 40 and are positioned in close proximity to the rearward portion 42 thereof. The pair of pedals, which will hereinafter be identified as first and second pedals 65 and 70, respectively, are individually mounted to the opposite ends of a shaft 71 which is rotatably mounted in the second tube 55 by suitable bearings (not shown). Each of the pedals 65 and 70 has an inwardly disposed portion, or inside bar 72, which has first and second ends 73 and 74, respectively. An orifice 75 is formed in each end of the inside bar, the orifice 75 disposed at the first end being operable releasably to mate with the shaft 71. The orifice 75 disposed at the second end is operable to mount a spacing bar which will hereinafter be discussed in greater detail.

Each of the pedals 64 has an outwardly disposed portion, or outside bar 80 which has a first end 81 and a second end 82. Individually formed in close proximity to the first and second ends thereof are a pair of orifices designated generally by the numerals 83 and 84, respectively. Slidably mounted in fixed mating receipt in the orifices 75 and 83, respectively, is a spacing bar 85 which is operable to position the inwardly and outwardly disposed portions of the pedals 72 and 80 in substantially parallel fixed spaced relation one with the other. The significance of this feature will hereinafter be discussed in greater detail. A pedal portion 90 is screwthreadably received in the orifice 84 and is disposed for rotational movement. The pedal portion, of course, is operable to receive one of the operator's feet 20. A sprocket 91 is affixed, using conventional fastening techniques to the shaft 71. The sprocket 91 is of conventional design, that is, it has a plurality of substantially equally spaced teeth 92 which are operable matingly to engage the continuous chain 37. It should be readily appreciated, therefore, that individual movement of the pair of pedals 64 along a substantially circular path of travel (not shown) causes a corresponding rotational movement of the second wheel 24. A front fork 93 is rotatably mounted in the tube 43 at the forward portion 41 of the frame 40. The front fork 93 has a pair of spaced apart support members or arms 94 which are adapted to mount the first wheel 23 for rotational movement and are further operable to place or otherwise orient the first wheel 23 in selected operational attitudes thereby permitting the bicycle 11 to be directed in a predetermined direction of travel (not shown) across the surface of the earth 13. A spindle 95 is slidably mounted in the tube 43 and is affixed to the front fork. The spindle, when rotated, is operable to impart substantially simultaneous rotational movement to the front fork.

As best illustrated by reference to FIGS. 1 and 10, a steering bar 100 having first and second ends 101 and 102, respectively, is affixed, using welding or other suitable fasteners to the spindle 95. An elongated slot or channel 103 is formed in the steering bar and is disposed in close proximity to the second end thereof. As should be understood, the steering bar is operable to impart rotational movement to the spindle 95 thereby causing a substantially simultaneous rotational movement to the front fork 93. A steering assembly, which is generally indicated by the numeral 104, is disposed in close proximity to the forward portion 41 of the frame 40. The steering assembly 104 includes a first and second support 105 and 110, respectively. The first support 105 is mounted to the tube 43, and the second support 110 is disposed in substantially parallel fixed spaced relation to the first support and is affixed by welding or the like to the top pair of cross bars 45. Each support, 105 and 110, mounts a substantially cylindrically shaped housing 111 which defines a channel 112. Each housing 111 is aligned or otherwise disposed in substantial registry one with the other and are individually dimensioned slidably to receive in rotatable mating relation, a steering column 113. The steering column, which is disposed in a substantially horizontal attitude and in substantially parallel fixed spaced relation to the top pair of cross bars 45, has a first or proximal end 114 and a second or distal end 115.

Figure 2:
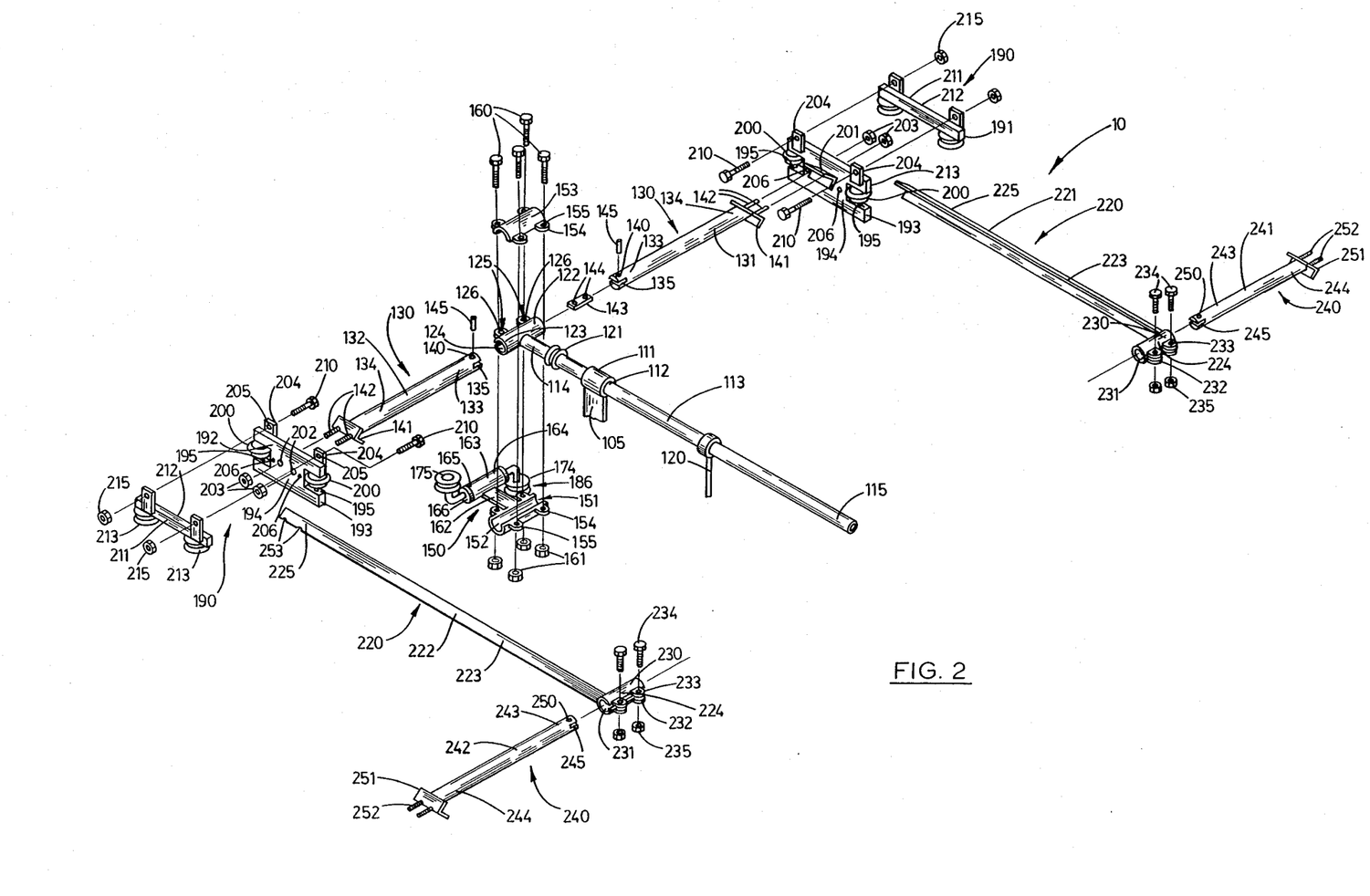
FIG. 2 is a somewhat enlarged, fragmentary, perspective, exploded view of the first form of the subject invention shown in FIG. 1.

A shaft 120 is mounted to and disposed in a substantially normal attitude with respect to the steering column 113 and further is positioned intermediate the proximal and distal ends 114 and 115 thereof. As best illustrated by reference to FIG. 1, the shaft 120 is slidably received in the channel 103 which is formed in the steering bar 100. As should be understood, the shaft is operable to impart movement to the steering bar 120 when the steering column is rotated about its longitudinal axis. This movement of the steering bar, of course, has the effect of causing a substantially simultaneous rotational movement of the front fork 93 thereby placing it in selected operational attitudes. Disposed in close proximity to the proximal end 114 of the steering column and mounted for rotational movement thereon is a pulley 121. The pulley is operable to receive a cable which will hereinafter be discussed in greater detail. A discontinuous housing, which is generally indicated by the numeral 122, is mounted to the proximal end 114 of the steering column 113 and is disposed substantially transversely thereof. The discontinuous housing has a wall 123 which defines a substantially cylindrically shaped channel 124. As seen most clearly by reference to FIG. 2, a pair of tabs 125 are mounted to the wall 123. Each of the tabs 125 has a bolt receiving orifice 126 formed therein.

A pair of arms 130 hereinafter designated and discussed as a first and second arm 131 and 132, respectively, are individually releasably mounted in the channel 124 at the proximal end 114 of the steering column 113. Each of the arms has a proximal or first end 133, and a distal or second end 134. As illustrated most clearly by reference to FIG. 2, a narrow slot 135 and an orifice 140 are individually formed in the first end thereof and a mounting bracket 141 is affixed to the second end 134. Each mounting bracket 141 has a pair of spaced apart threaded shafts 142 affixed thereto. A linking plate 143 is operable to couple together the first and second arms. The linking plate is dimensioned slidably to be received in the channel 124 and in the slots 135 which are individually formed in the first end of each arm. The linking plate has a pair of orifices formed therein which are individually adapted, when the linking plate is slidably received in each slot 135, substantially to align with the orifices 140 that are individually formed in each arm. A pair of pins 145 are dimensioned slidably to be received in each orifice 140 and 144, respectively, thereby securing the linking plate to each arm. This relationship is best imagined by a study of the exploded perspective view of FIG. 2.

An adjustable pulley assembly or cable tension device which is generally indicated by the numeral 150, is mounted at the proximal end 114 of the steering column 113, and adapted rotatably to receive and maintain a single, or multiple cables, depending on the form of the invention, in tension or otherwise in a taut state. The aforementioned cable(s) will hereinafter be discussed in greater detail. The adjustable pulley assembly includes a mounting bracket 151 that has a first portion 152 and second portion 153. A plurality of tabs 154 are individually mounted on the first and second portions 152 and 153, respectively, and bolt receiving orifices 155 are individually formed in each of the tabs 154. As shown most clearly by reference to FIG. 2, four bolts 160 are individually conformably dimensioned slidably to be received in the bolt receiving orifices 155, and two of the same bolts further are slidably received in the bolt receiving channels 126 of the discontinuous housing 122. Suitably dimensioned nuts 161 are individually screwthreadably received on and about the ends of the bolts 160 and are adapted to secure the first and second portions 152 and 153 together. Further, it should be understood that securing the first and second portions together has the effect of capturing the first end 133 of each arm 130 in the channel 124. A support member 162 is mounted to the first portion 152 of the mounting bracket 151 and has affixed thereto a substantially cylindrically shaped housing 163. The housing has a first and second end wall 164 and 165, respectively. Formed substantially centrally of each of the end walls 164 and 165 is an orifice 166. The housing 163 defines a channel 170 having a first and second end 171 and 172, respectively. A helical coil spring 173 is disposed in the channel 170 and is operable to bias a first and second pulley 174 175 thereagainst the respective end walls 164 and 165. The first and second pulleys 174 and 175 each has an angulated support rod 181 and 182, respectively. Mounted to one end of each of the support rods and slidably disposed in the channel 170 is a plate 183 which rests thereagainst the coil helical spring 173. A bearing 184 is mounted on each pulley, and is operable to allow same to rotate substantially freely about each of the support rods 181 and 182, respectively. The adjustable pulley assembly 150 has a first position indicated by the numeral 185 wherein both pulleys 174 and 175 are mounted in upwardly facing relation; and a second position 186 wherein the first and second pulleys are individually disposed alternatively in upwardly and downwardly disposed relation. The first and second positions are best understood by reference to FIGS. 4 and 3, respectively.

A pair of carriages 190 are borne by the frame 40 and are individually mounted to the second or distal ends 134 of each of the arms 131 and 132, respectively. The pair of carriages, which will hereinafter be designated and discussed as a first carriage 191, and a second carriage 192, each has a first portion 193. The first portion 193 has a substantially rectangularly shaped main body 194, and a pair of substantially rectangularly shaped channels 195 are individually formed in the opposite ends thereof. Each channel 195 is operable rotatably to mount a guide wheel 200. As illustrated most clearly by reference to FIG. 3, the guide wheels 200 are individually conformably dimensioned rotatably to mate with the inwardly facing portion of a support member. Further, the guide wheels are operable individually to receive a cable. The support members and the cables will hereinafter be discussed in greater detail. As best understood by reference to FIG. 2, a mounting bracket 201 is affixed to the main body 194 by using welding or other suitable fasteners and is adapted conformably to mate with the mounting bracket 141 which is disposed on the second end 134 of each arm. A pair of apertures or bolt receiving orifices 202 are formed in each mounting bracket, and extend through the main body 194. The pair of apertures are operable slidably to receive the threaded shafts 142 therein, and a pair of nuts 203 are operable screwthreadably to be received on the threaded shafts and are adapted releasably to secure each arm to one of the carriages 190. A pair of mounting tabs 204, which have individual orifices 205, formed therein, are affixed to the main body 194. Further, a second pair of spaced apart orifices 206 are formed in the main body 194 and are operable slidably to receive the individual cables which will hereinafter be discussed in greater detail. The orifices 205 are conformably dimensioned slidably to receive individual bolts 210. Each carriage 190 further includes a second portion, which is generally indicated by the numeral 211. The second portion, which is releasably mounted to the first portion, similarly has a main body 212 which mounts a pair of spaced apart guide wheels 213. The spaced apart guide wheels 213 are also individually conformably dimensioned rotatably to mate with the individual support members. The pair of guide wheels 200 and 213, respectively, in combination, support for slidable movement the individual support members and further define a space or channel 214 when the first and second portions are secured together. A pair of nuts 215 are individually adapted screwthreadably to be received on and about each bolt 210 thereby securing or otherwise coupling the first portion 193, and the second portion 211 together. This is best illustrated by reference to FIG. 2.

A pair of reciprocally movable members 220 hereinafter indicated in the first form of the invention 10 as a first and second member 221 and 222, respectively, are individually slidably mounted in the channels 214 which are defined by the pairs of guide wheels 200 and 213, respectively. Each member 221 and 222 includes an elongated support member 223 which is herein illustrated as a piece of substantially right-angularly shaped stock which may be metal, or alternatively, some other suitable synthetic material. Each support member further has a first end 224 and a second end 225. A discontinuous housing 230 which defines a channel 231 is mounted to the first end 224 of each of the support members 223. Each of the discontinuous housings mounts a plurality of tabs 232 which have individual orifices 233 formed therein. A plurality of bolts 234 are individually adapted slidably to be received in the orifices 233, and nuts 235 are screwthreadably received on and about same. The bolts and nuts 234 and 235 are operable individually to secure a second pair of arms 240 in releasable mating receipt in the channels 231. The second pair of arms 240, which will hereinafter be designated as a third and fourth arm 241 and 242, respectively, are substantially identical to the first pair of arms 130 in their overall physical appearance, however it should be noted that the overall length dimension of the third and fourth arms is somewhat less than the length dimension of the pair of arms 130. Each of the arms 241 and 242 has a first or proximal end 243, and a second or distal end 244. Similarly, a slot 245 and an orifice 250 are individually formed in the first end thereof. A mounting bracket 251 is affixed, using welding or the like, to the second end of the third and fourth arms and a pair of threaded shafts 252 are affixed thereto. A pair of spaced apart apertures or orifices 253 are formed in the second end 225 of each member 221 and 222, respectively.

Figure 3:
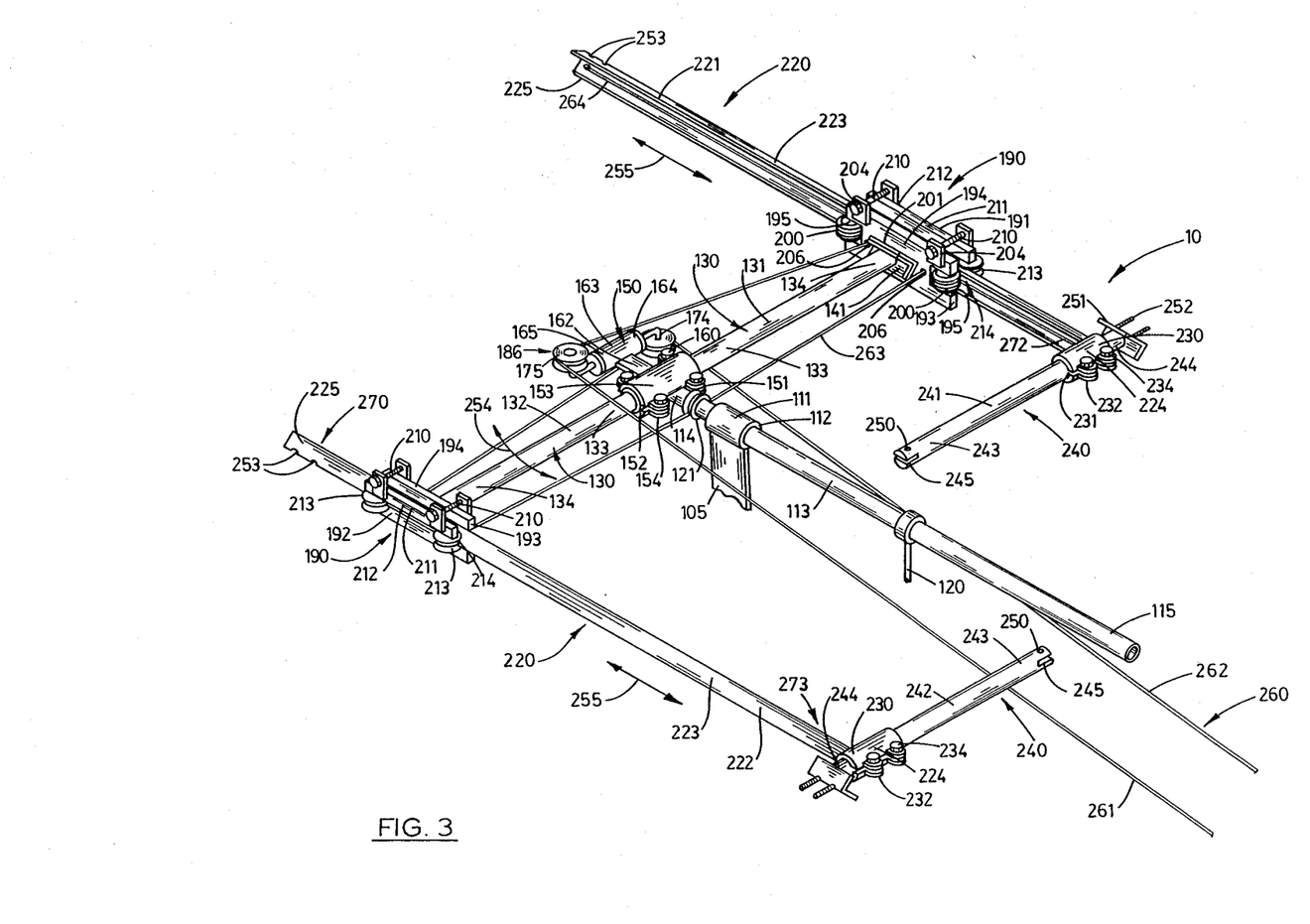
FIG. 3 is a second somewhat enlarged, fragmentary, perspective view of the first form of the subject invention.

The arms 130 are adapted to be moved in a first substantially vertically disposed and arcuately shaped path of travel 254, and as best seen by reference to FIGS. 1 and 3, the members 221 and 222, respectively, are operable, reciprocally, to move in opposite directions of travel along a second path of travel which is designated by the numeral 255. As should be understood, the third and fourth arms 241 and 242, respectively, operate in the first form of the invention 10 as handles which are grasped by the operator 12. Further, the movement of the arms 130 along the first path of travel imparts rotational movement to the steering column 113 about its longitudinal axis. As earlier discussed, rotational movement of the steering column 113 has the effect of causing the front fork 93 to be positioned or otherwise oriented in predetermined operational attitudes thereby allowing the frame 40 to move in a predetermined direction of travel across the surface of the earth 13.

A plurality of cables 260, hereinafter designated as first, second, and third cables 261, 262, and 263, respectively, are borne by the frame 40. The first cable 261 has a first end 264 which is mounted to the second end 225 of the first member 221. The first cable further has a second end 265 which mounts a ring 266. The ring has a suitable bearing surface 267 and is rotatably received on and about the spacing bar 85. As should be understood, the first cable is operable to be received through the orifice 206, rides against one of the guide wheels 200, and is further received on and about the second pulley 175. The first cable is also received by the plurality of pulleys 56 which are disposed along the top pair of cross bars 45. In this fashion, the first cable is disposed in force transmitting relation to the second pedal 70. Thus when the first member 221 is pushed by the operator 12 along the second path of travel 255 the physical energy imparted to same is transmitted along the first cable and is received at the second pedal 70. The pedal of course transmits this energy, through the continuous chain 37, to the second wheel 24 thereby causing rotational movement to same.

The second cable 262 has a first end 270 which is affixed to the second end 225 of the second member 222. The second cable is slidably received through one of the orifices 206 which is formed in the second carriage 192. The cable further is received about one of the guide wheels 200 and on and about the first pulley 174. The second cable thereafter is directed along the first pair of cross bars 45 by the several pulleys 56. The second cable has a second end 271 which also mounts a ring 266 having a suitable bearing surface 267. The ring 266 is rotatably received about the spacing bar 85 which is mounted on the first pedal 65. As should be understood, the second cable is disposed in force transmitting relation to the first pedal 65. Thus, when the second member is physically urged by the operator 12 along the second path of travel 255, the second cable is operable to transmit the force to the first pedal thereby causing the continuous chain 37 to impart rotational movement to the second wheel 24.

The third cable 263 has a first end 272 which is mounted to the first end 224 of the first member 221; and a second end 273 which is mounted to the first end 224 of the second member 222. The third cable is received about two of the guide wheels 200 and extends through the orifices 206 which are formed in the first and second carriages 191 and 192, respectively. The third cable further is slidably received on the pulley 121 which is rotatably mounted about the steering column 113. As should be understood, the third cable is operable to transmit force from one member to the other and is adapted to urge the first and second members in substantially opposed directions of travel along the second path of travel 255.

SECOND FORM

Figure 4:
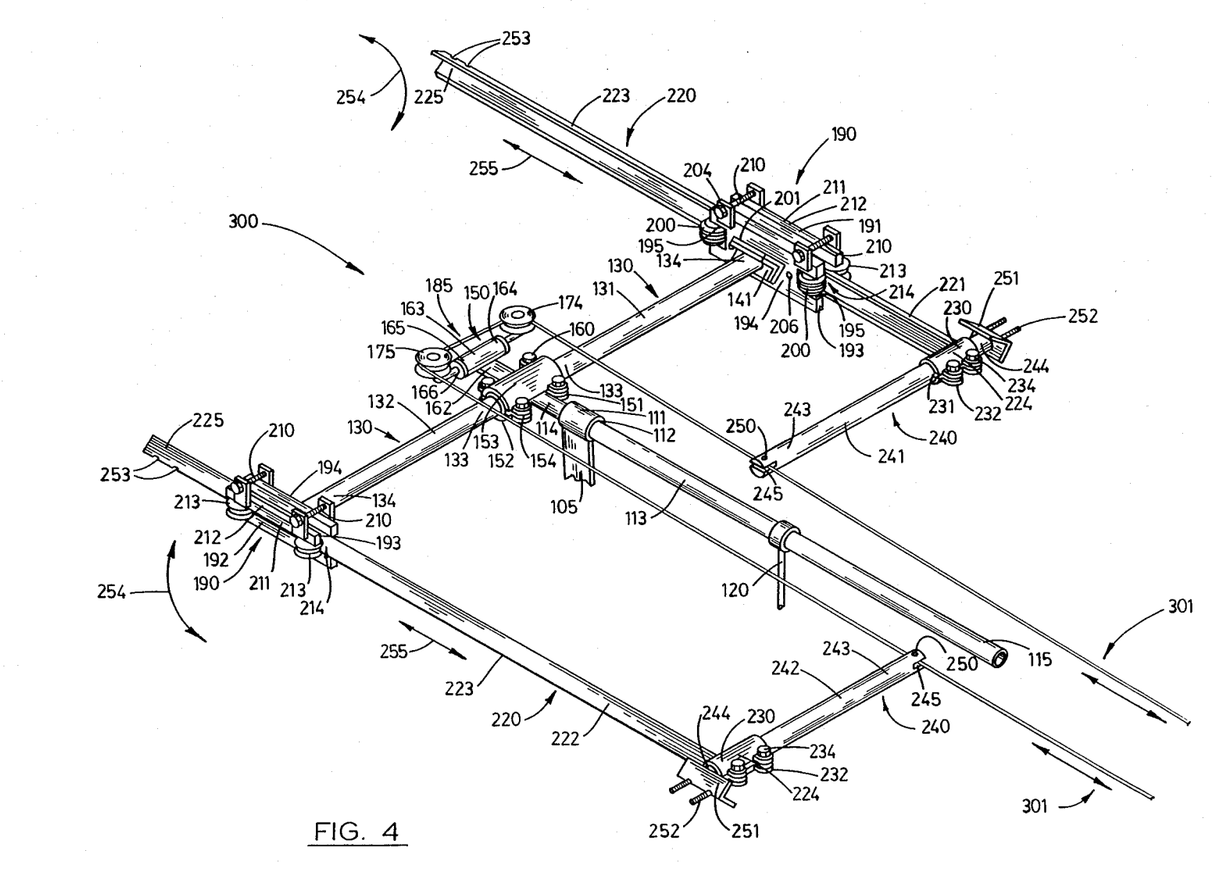
FIG. 4 is a somewhat enlarged, fragmentary, perspective view of the second form of the subject invention.
Figure 5:
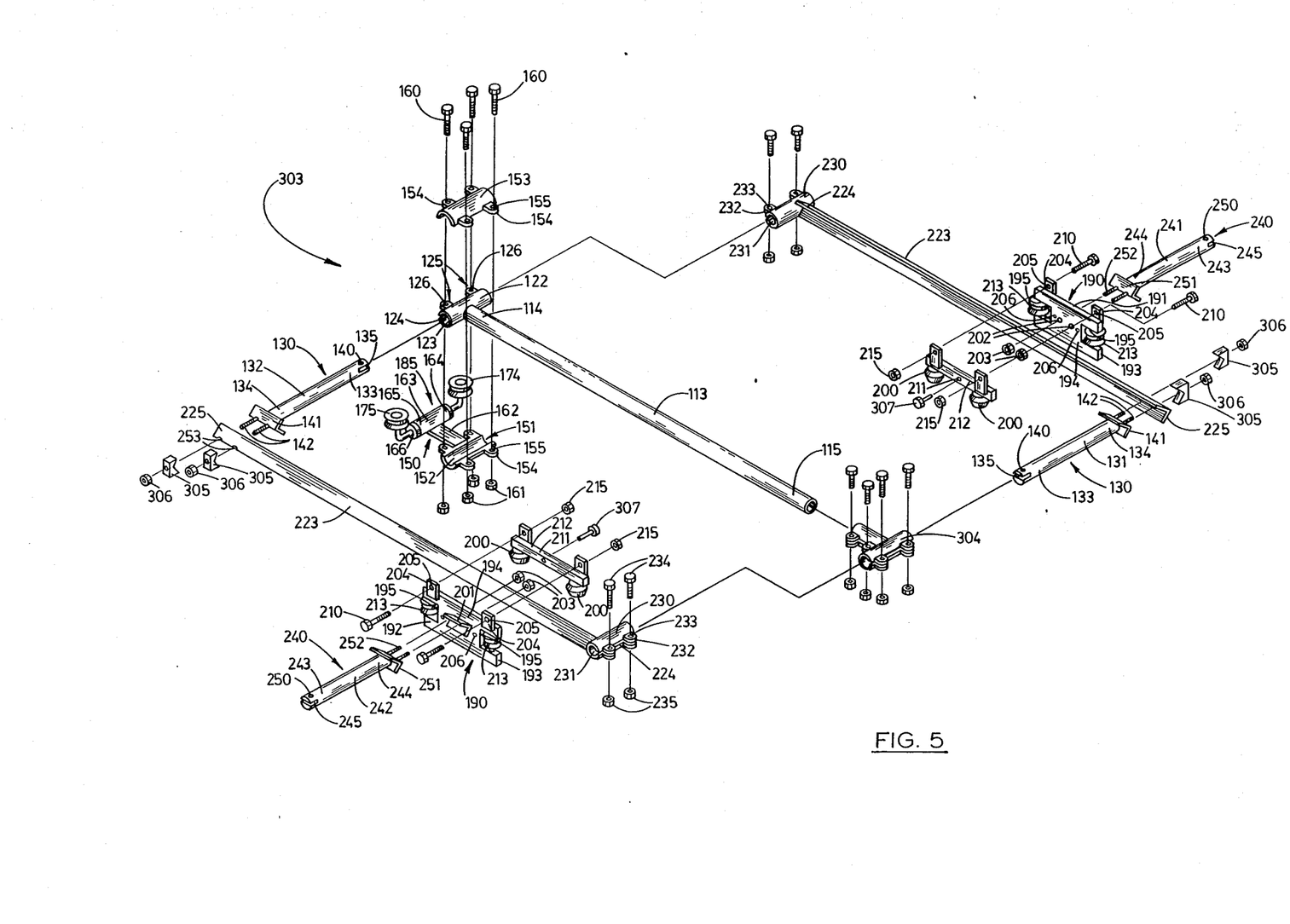
FIG. 5 is a somewhat enlarged, fragmentary, perspective, exploded view of the third form of the subject invention.

Referring more particularly to the drawings, the second form of the propulsion apparatus of the subject invention is generally indicated by the numeral 300 in FIGS. 4 and 5. For illustrative convenience, it should be understood that the second form 300 is substantially identical to the first form of the instant invention except as noted hereinafter. More particularly, the second form of the invention is a reconfiguration of the apparatus 10 which utilizes the various components which make up the first form. The features which distinguish the second form 300 from the first form of the instant invention are directed to the use of a single cable 301, and the orientation of the adjustable pulley assembly 150. As best understood by a study of FIG. 4 the adjustable pulley assembly 150 is shown oriented in the first position 185 wherein the first and second pulleys 174 and 175, respectively, are each oriented in upwardly disposed relation. The adjustable pulley assembly is, of course, operable to receive and maintain the cable 301 in tension or otherwise in a taut state. The cable 301 has first and second ends, not shown, which individually mount a ring 266 having a suitable bearing surface 267. As should be appreciated the pair of rings 266 are individually rotatably disposed about each spacing bar 85 which are individually mounted on each pedal 65 and 70, respectively. The cable 301 is also received by the plurality of pulleys 56 which are rotatably mounted along the top pair of cross bars 45. As best illustrated by reference to FIG. 4, the second pair of arms 240, which operate in this form as handles that are grasped by the operator 12, are individually mounted or otherwise affixed to the cable 301 at locations intermediate the first and second ends thereof. The cable 301 is mounted in the slots 245 that are individually formed in the first ends 243 thereof, and a suitable fastener, not shown, is received in the orifices 250 and thereby secures the cable in mating receipt therewithin. As should be appreciated, when the first and second members 221 and 222, respectively, are reciprocally urged along the second path of travel 255, the physical force of the operator 12 is transmitted through the handles or arms 240 to the cable 301 and then onto the individual pedals 65 and 70, respectively. As earlier discussed this physical force is then transmitted through the continuous chain 37 to the second wheel 24 thereby imparting rotational movement to same.

THIRD FORM

Figure 6:
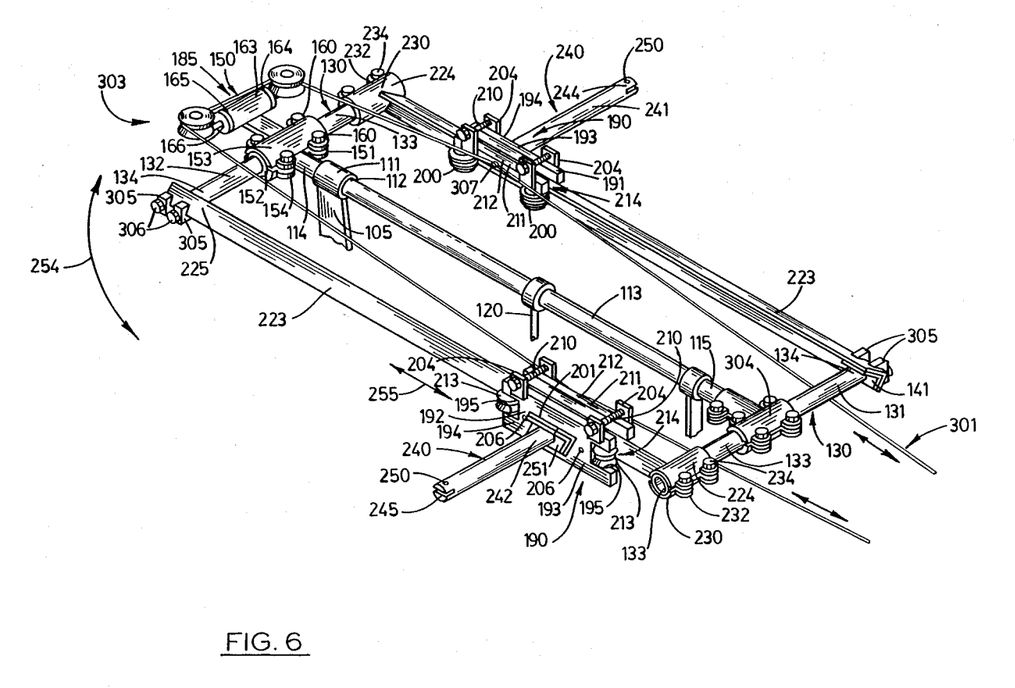
FIG. 6 is a second somewhat enlarged, fragmentary perspective view of the third form of the subject invention.

Referring more particularly to the drawings, the third form of the propulsion apparatus of the subject invention is generally indicated by the numeral 303 in FIGS. 5 and 6. As earlier discussed the apparatus 10 is operable to be reconfigured in a number of different forms to suit any operator's preferences utilizing the same subassemblies. More particularly the features which distinguish the third form 303 from the first and second forms 10 and 300, respectively, are primarily directed to the mounting of the individual arms 130 at the proximal and distal ends 114 and 115, respectively of the steering column 113, and the individual slidable movement and the positioning of the pair of carriages 190 along each of the elongated support members 223.

As best seen by reference to FIG. 6, a substantially T-shaped mounting bracket 304 is affixed using suitable fasteners to the distal end 115 of the steering column 113 and is adapted slidably to receive the first arm 131 therein. The first ends 133 of each of the arms 130 are individually slidably received in each of the discontinuous housings 230 and are affixed in secure mating receipt therein by the bolts 234. The second ends 134 and more particularly the mounting bracket 141 individually matingly engage each support member 223, and the threaded shafts 142 are slidably received in the pair of orifices 253 which are formed in the second end 225 of each of the support members. A plurality of angulated fixtures 305 are individually operable conformably to mate with each support member and are operable slidably to receive each threaded shaft therein. A nut 306 is adapted screwthreadably to be received about each threaded shaft thereby securing each arm 130 thereto.

As can best be appreciated by a comparison study of FIGS. 4 and 6, the pair of carriages 190 are illustrated in FIG. 6 in a reversed position, that is, the first and second portions 193 and 211, respectively, are opposite to that shown in FIG. 4. Moreover, it should be noted that the pair of guide wheels 200 which were previously mounted on the first portion 193 in the first and second forms of the invention, are now rotatably borne by the second portion 211, and the second pair of guide wheels 213 which were rotatably borne by the second portion 211 are, in the third form, now borne by the first portion 193. This is a further example to illustrate how the instant invention can be readily reconfigured into several different forms to suit any operational condition or operator preference.

The pair of carriages 190 are individually slidably received on each of the support members 223 and are operable reciprocally to move in substantially opposed directions of travel along the second path of travel 255. The two pairs of guide wheels 200 and 213, respectively, are individually operable rotatably to engage each support member and are thereby operable to support the first and second portions 193 and 211 in individual reciprocally slidable relation on each of the support members. The second portions 211, as best illustrated by reference to FIG. 6, are individually affixed to the cable 301, utilizing a suitable fastener 307. The pair of carriages 190, which operate in the third form of the invention as reciprocally movable members, are affixed to the cable at predetermined locations intermediate its proximal and distal ends (not shown). As earlier discussed, the adjustable pulley assembly 150 is operable to maintain the cable 301 in tension or otherwise in a taut state as the carriages 190 are moved in substantially opposed directions of movement along the second path of travel 255. The first and second ends of the cable 301, of course, are individually mounted to the pedals 64 in the fashion discussed heretofore. Further, the second pair of arms 240 are individually mounted to the carriages 190 and are oriented in outwardly disposed hand receiving engagement by the operator 12. The pair of arms 130, of course, are operable selectively to move along the first path of travel 254 and are adapted thereby to cause the first wheel 23 to be oriented in selected operational attitudes for purposes of positioning the frame 40 in predetermined directions of travel across the surface of the earth 13.

FOURTH FORM

Figures 7, 8:
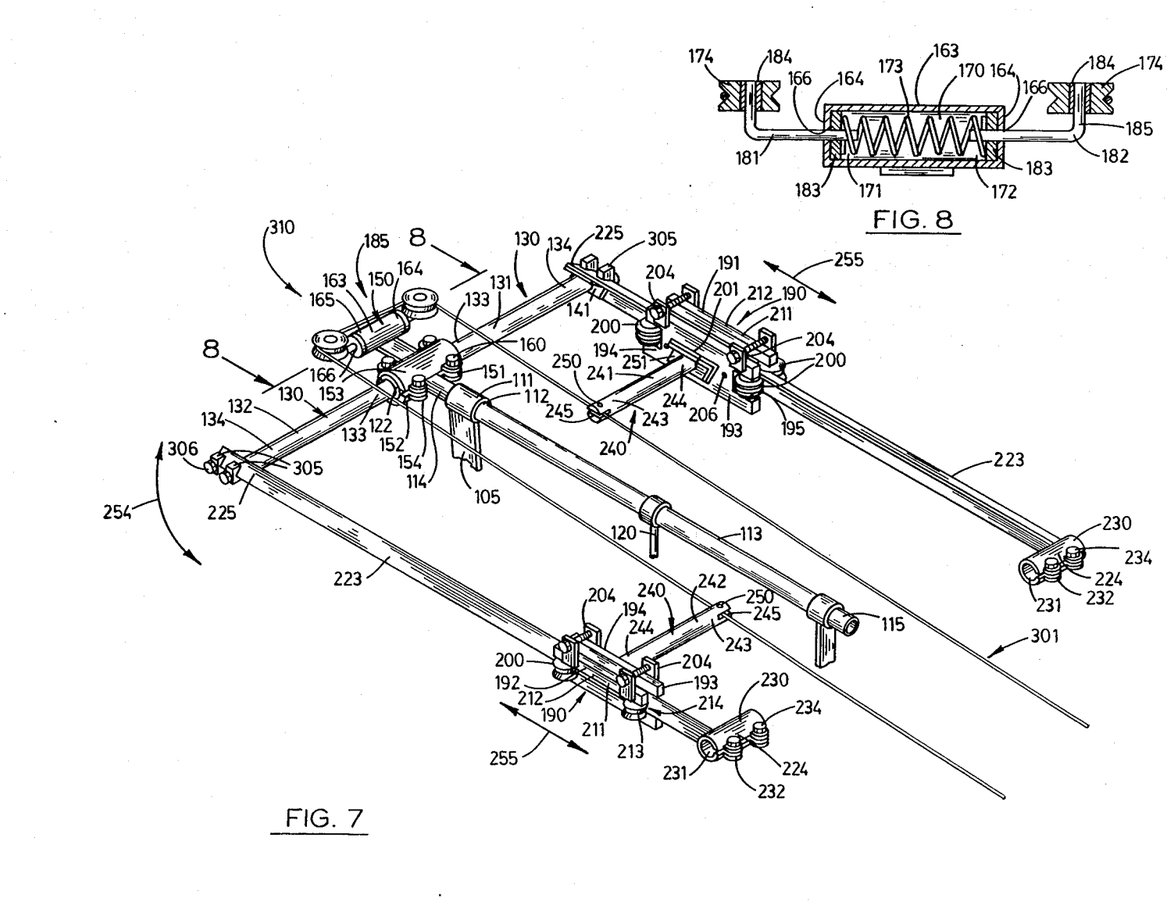
FIG. 7 is a somewhat enlarged, fragmentary, perspective view of the fourth form of the subject invention.
FIG. 8 is a longitudinal vertical section taken along line 8—8 of FIG. 7 and showing the adjustable pulley assembly of the subject invention.

Referring more particularly to the drawings, the fourth form of the propulsion apparatus of the subject invention is generally indicated by the numeral 310 in FIG. 7. The third form 310, of course, is a further reconfiguration of the apparatus 10 utilizing the assorted subassemblies which were discussed heretofore. More particularly, the features which distinguish the fourth form of the instant invention from the preceding three forms 10, 300, and 303, respectively, relates generally to the relative positions and operation of the two pairs of arms 130 and 240, respectively, and the position of the carriages 190 on the support members 223. As should be understood, the first pair of arms 130 are mounted to the proximal end 114 of the steering column 113 by the discontinuous housing 122 in the fashion which was discussed previously with respect to the first form. The distal or second ends 134 of each of the arms are individually mounted, in a fashion similar to that previously discussed with respect to the third form 303 of the invention, that is, to the second end 225 of each support member 223. The pair of carriages 190 are reversed from that shown in the third form, that is, the first and second portions 193 and 211, respectively, are returned to the positions illustrated in the first and second forms, and the pair of carriages 190 are individually slidably disposed for reciprocal slidable movement along the second path of travel 255. Further a close comparison of FIGS. 6 and 7 discloses that the first and second pair of guide wheels 200 and 213, respectively, are reversed from that which is shown with respect to the third form 303 of the instant invention, that is, the second pair of guide wheels 213 which were mounted on the first portion 193 are now mounted on the second portion 211, and the first pair of guide wheels 200 which were mounted on the second portion 211 are now mounted on the first portion 193. This repositioning of the guide wheels 200 and 213, respectively, allows each carriage 190 to position the individual arms 240 in substantially inwardly facing relation. As earlier discussed with respect to the second form 300 of the instant invention, the first end 243 of each arm 240 is affixed to the cable 301 at predetermined locations intermediate its proximal and distal ends (not shown). The cable 301, of course, is affixed to each pedal 64 in a fashion similar to that discussed heretofore with respect to the first form of the invention. In all other respects, the fourth form of the invention operates in a fashion substantially identical to that of the preceding three forms, that is, the carriages 190 act as reciprocally movable members and are operable to be reciprocally urged in substantially opposed directions of travel along the second path of travel 255. The physical force exerted by the operator 12 on the second pair of arms 240, which operate in the fourth form as handles is transmitted through the individual arms 241 and 242, respectively, to the cable 300 where it is then directed to the pair of pedals 64. The pair of pedals, of course, transfers the physical energy through the continuous chain 37 to the second wheel 24 thereby imparting rotational movement to same.

OPERATION

The operation of the described embodiments of the present invention is believed to be readily apparent and is briefly summarized at this point.

The apparatus 10 is best understood by a close study of FIGS. 1 and 3. As shown therein, the steering assembly 104 is mounted to the forward portion of the frame 40 and is operable rotatably to mount a steering column 113. A pair of arms which, are generally indicated by the numeral 130 are individually mounted to the steering column, at its proximal or distal end 114 and 115, respectively, depending on the form of the invention utilized, and are operable to move along the substantially vertically disposed and arcuately shaped first path of travel 254. The movement of the arms 130 along the first path of travel, of course, imparts rotational movement to the steering column which in turn urges the steering bar 100 to move. The steering bars movement translates into a corresponding rotation of the front fork 93 which orients the first wheel 23 into a selected operational attitude.

Depending upon the form of the invention 10, 300, 303, or 310, the apparatus slidably mounts a pair of reciprocally movable members which are individually operable to travel in opposed directions of travel along the second path of travel 255. In the first and second forms of the invention 10 and 300, respectively, the reciprocally movable members are represented by the pair of elongated support members 223 which are slidably mounted in the channel 214 defined by the pair of carriages 190. In the third and fourth forms of the invention, the same reciprocally movable members are represented by the pair of carriages 190 which are individually slidably received for movement along the support members 223. In each instance, the reciprocally movable members are affixed to a cable 301, or cables 261, 262, and 263, respectively, depending upon the form of the invention utilized, for the purpose of receiving the physical energy imparted to the individual members by the operator 12 and transmitting it to the individual pedals 64 where it is thereafter transferred to the second wheel 24 via the chain 37, thereby imparting rotational movement to same.

Therefore, it will be seen that the apparatus 10 has particular utility when mounted on and used in combination with a bicycle 11. The apparatus in its various forms provides a fully dependable and practical means for propelling the bicycle in earth traversing movement and further provides a fully effective means by which an operator can exercise his upper extremities while utilizing same. The apparatus of the subject invention further is operable to be reconfigured into a number of different forms utilizing the same parts to suit any operational conditions or operator preferences, and is both of sturdy and dependable construction and is relatively inexpensive to maintain.

Although the invention has been herein shown and described in what are conceived to be the most practical and preferred embodiments, it is recognized that departures may be made therefrom within the scope of the invention which is not to be limited to the illustrative details disclosed.

Having described my invention, what I claim as new and desire to secure by Letters Patent is:

1. An apparatus for propelling an operator in earth traversing movement comprising
    a frame having forward and rearward positions and mounting an operator's support adapted to receive said operator in rested relation thereon in an operational position, a fork having a spindle rotatably mounted on the forward portion of the frame mounting a first wheel and mounting a second wheel, said first and second wheels disposed for rolling movement along the surface of the earth;
    a steering assembly borne by the frame including a steering bar mounted on the spindle, first and second supports, the first support mounted on the forward portion of the frame and disposed in close proximity to said fork and the second support mounted on the frame and disposed in spaced relation to the first support, the first and second supports disposed in substantial alignment one with the other, and a steering column mounting a pair of arms and a shaft rotatably mounted in a substantially horizontal attitude on the first and second supports, the shaft adapted to engage and move the steering bar thereby causing the fork to rotate when rotational movement is imported to the steering column to position the first wheel in selected operational attitudes for directing the frame during said rolling movement;
    a pair of pedals rotatably borne by the frame and disposed in power transmitting relation to the second wheel for engagement by the operator; and
    a pair of reciprocally movable members borne by the steering assembly and connected in force transmitting relation to said pedals for engagement by the operator and operable to impart physical force to said pedals for propelling the apparatus.

2. The apparatus of claim 1 wherein the pair of arms are operable to be moved along a first substantially vertically oriented and arcuately shaped path of travel, the arms operable when moved along the first path of travel to impart rotational movement to the steering column; and the two reciprocally movable members are operable to move in substantially opposed directions of movement along a second predetermined path of travel.

3. The apparatus of claim 2 wherein the steering column has a proximal end which mounts the pair of arms, and the shaft is mounted to the steering column at a substantially normal attitude.

4. The apparatus of claim 3 wherein first and second cables individually connect each member with one of the pedals, the cables individually transmitting force from each member to the respective pedals; and an adjustable pulley assembly is borne by the frame and adapted to receive each cable, said pulley assembly operable to maintain each cable in a taut state.

5. The apparatus of claim 4 wherein each arm has a distal end which mounts a mounting bracket, and a carriage is mounted on each mounting bracket and individually adapted slidably to carry one of the members along the second path of travel; and a third cable connects the members together, the third cable operable to transmit force from one member to the other.

6. The apparatus of claim 5 wherein each of the members has an elongated main body with first and second ends, and a handle is mounted to the first end of each member; and the first and second cables are individually affixed to the second end of one of the members, and the third cable is connected to the first end of each member.

7. The apparatus of claim 2 wherein the steering column has opposite ends, and the pair of arms are individually mounted on the opposite ends of the steering column; and two support members each having an elongated main body, are individually mounted on the pair of arms and are disposed in substantially fixed spaced relation one to the other; and each reciprocally movable member is a carriage which is individually slidably mounted on each support member, each carriage further mounting a handle which is disposed in outwardly facing relation.

8. The apparatus of claim 7 wherein a cable has proximal and distal ends which are individually affixed to the pedals, and each carriage is affixed to the cable at a position intermediate the proximal and distal ends; and an adjustable pulley assembly is borne by the frame and adapted to receive the cable, the adjustable pulley assembly maintaining the cable under tension as each carriage is individually moved in substantially opposite directions of travel along the second path of travel.

9. The apparatus of claim 2 wherein each arm of said pair of arms has a distal end mounting a carriage individually operable slidably to carry one of the members along the second path of travel.

10. The apparatus of claim 9 wherein each member has an elongated main body with first and second ends, and a handle is mounted to the first end of the main body and is disposed in substantially inwardly facing relation; and a cable has a proximal end and a distal end which are individually connected to the pedals, and the handles are affixed on the cable at positions intermediate the proximal and distal ends thereof.

11. The apparatus of claim 10 wherein an adjustable pulley assembly is borne by the frame and adapted to receive the cable, the pulley assembly maintaining the cable in a taut condition as each member is moved in substantially simultaneously opposed directions of movement along the second path of travel.

12. The apparatus of claim 2 wherein each arm or said pair of arms has a distal end, and a support member having an elongated main body is mounted on the distal end of each arm; and the reciprocally movable members are carriages which are individually slidably mounted on each support member, and a pair of handles are individually mounted to each carriage and are disposed in substantially inwardly facing relation.

13. The apparatus of claim 12 wherein a cable has a proximal and a distal end which are individually affixed to the pedals, and each of the handles is individually affixed on the cable at a position intermediate the proximal and distal ends thereof; and an adjustable pulley assembly is borne by the frame and adapted to receive and maintain the cable in a taut state as each carriage is moved in substantially opposed directions of movement along the second path of travel.

14. An apparatus for propelling an operator in earth traversing movement comprising
- a frame adapted to support the operator in earth traversing movement and having first and second ends and mounting at least two wheels which are individually mounted in close proximity to said first and second ends thereof and disposed in rolling engagement with the surface of the earth, and a seat mounted on the frame and operable to support the operator thereon;
- a fork mounting a spindle rotatably mounted to the first end of the frame and adapted rotatably to mount one of the wheels;
- first and second supports mounted on the frame, the first support disposed at the first end of the frame and the second support disposed in spaced relation to the first support, the first and second supports individually mounting housings which are substantially aligned one with the other;
- a steering column, having proximal and distal ends, borne by the first and second supports and slidably and rotationally received in the housings;
- a steering bar affixed on the spindle and having a channel formed therein;
- a shaft mounted on the steering column and disposed intermediate the proximal and distal ends thereof, the shaft slidably received in said channel;
- at least one arm mounted on the proximal end of the steering column and operable to move along a first substantially vertically disposed and arcuately shaped path of travel, the arm when moved along the first path of travel imparting rotational movement to the steering column for positioning the wheel disposed at the first end of the frame in selected operational attitudes for steering the apparatus;
- first and second pedals rotatably mounted on the frame and connected in force transmitting relation to the wheel mounted in close proximity to the second end of the frame;
- at least one reciprocally movable member slidably borne by the arm and adapted to be engaged by the hand of the operator, the member moving along a predetermined second path of travel; and
- at least one cable slidably mounted on the frame and connecting the reciprocally movable member to the first pedal, the cable operable to transmit force from the reciprocally movable member to the first pedal to propel the apparatus.

15. The apparatus of claim 14 wherein a second arm is mounted on the proximal end of the steering column and a second reciprocally movable member is slidably borne by the second arm, the second member operable to move along the second path of travel in a substantially opposed direction of movement to that of the first member.

16. The apparatus of claim 15 wherein each arm has a distal end, and a carriage is mounted on the distal end of the arm and adapted slidably to carry each member along the second path of travel; and a second cable is borne by the frame and connects the second member to the second pedal, the second cable operable to transmit force from the second member to the second pedal to propel the apparatus.

17. The apparatus of claim 16 wherein each carriage has a first portion which is mounted on the distal end of each arm, the first portion of each carriage mounting a pair of spaced guide wheels which are operable individually to engage each reciprocally movable member, and a second portion is mounted on the first portion and further mounts a second pair of spaced guide wheels which are operable individually to engage each member; and a third cable is borne by the frame and connects the members, the third cable transmitting physical energy from one member to the other for substantially simultaneous movement of the arms in opposite directions of movement along the second path of travel.

18. The apparatus of claim 17 wherein each reciprocally movable member has a main body with first and second ends, and a handle is mounted on each first end; and the first and second cables are individually connected to the second ends of the members and the third cable connects the first ends of the members.

19. The apparatus of claim 18 wherein an adjustable pulley assembly is borne by the frame and disposed in close proximity to the proximal end of the steering column, the pulley assembly adapted to receive the first and second cables, and operable to maintain each cable in a taut condition as the members of said pair of members are moved along the second path of travel.

20. The apparatus of claim 15 wherein each arm has a distal end and a carriage is mounted on the distal end of each arm and adapted slidably to carry each member along the second path of travel; and the cable has a proximal and a distal end which are individually mounted on the pedals; and a handle is individually mounted on each member and is individually affixed on the cable at locations intermediate its proximal and distal ends.

21. The apparatus of claim 26 wherein an adjustable pulley assembly is borne by the frame and disposed in close proximity to the proximal end of the steering column and the pulley assembly is adapted to receive the cable and operable to maintain the cable in a taut condition as each member is moved along the second path of travel.

22. The apparatus of claim 15 wherein each arm has a distal end and a support member is mounted on the distal end of each arm and individually adapted slidably to receive and to guide one of said reciprocally movable members along the second path of travel.

23. The apparatus of claim 22 wherein the cable has a proximal and a distal end which are individually mounted on the pedals; and each of the reciprocally movable members is a carriage which is individually slidably mounted on one of the support members, and a handle is mounted on each carriage and individually affixed on the cable at predetermined locations intermediate the proximal and distal ends thereof.

24. The apparatus of claim 23 wherein an adjustable pulley assembly is borne by the frame and disposed in close proximity to the proximal end of the steering column, the pulley assembly adapted to receive the cable and operable to maintain the cable in a taut state as each of the carriages is moved along the second path of travel.

25. The apparatus of claim 14 wherein a second arm is mounted on the distal end of the steering column and is disposed in substantially parallel fixed spaced relation to the arm mounted on the proximal end thereof; and two support members are individually mounted on the arms disposed in substantially parallel spaced relation to each other; and a second reciprocally movable member is slidably borne on the second arm and is adapted to be engaged by one of the hands of the operator, the second member adapted to move along the second path of travel in a substantially opposed direction of movement to the first member.

26. The apparatus of claim 25 wherein each of the reciprocally movable members is a carriage which is individually slidably mounted on one of the support members, and a handle is mounted on each of the carriages and is disposed in outwardly facing relation; and the cable has a proximal and a distal end which are individually mounted on the pedals, and each of the carriages is affixed to the cable at a predetermined location intermediate the proximal and distal ends thereof.

27. The apparatus of claim 26 wherein an adjustable pulley assembly is borne by the frame and disposed in close proximity to the proximal end of the steering column, the pulley assembly operable to receive and maintain the cable in a taut state as each of the members is moved along the second path of travel.

* * * * *

UNITED STATES PATENT AND TRADEMARK OFFICE
CERTIFICATE OF CORRECTION

PATENT NO. : 4,838,568
DATED : June 13, 1989
INVENTOR(S) : Joe Arroyo

It is certified that error appears in the above-identified patent and that said Letters Patent is hereby corrected as shown below:

Column 7, Line 31

Insert ---and--- between "174" and "175"

Column 15 Line 28

Delete "or" and insert ---of---

Column 17, Line 8

Delete "26" and insert ---20---

Signed and Sealed this

Twenty-seventh Day of February, 1990

*Attest:*

JEFFREY M. SAMUELS

*Attesting Officer*     *Acting Commissioner of Patents and Trademarks*